US008832368B1

(12) United States Patent
Coatney et al.

(10) Patent No.: US 8,832,368 B1
(45) Date of Patent: Sep. 9, 2014

(54) METHOD AND APPARATUS FOR SLICING MASS STORAGE DEVICES

(75) Inventors: Susan M. Coatney, Cupertino, CA (US); Stephen H. Strange, Mountain View, CA (US); Douglas W. Coatney, San Jose, CA (US); Atul Goel, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 621 days.

(21) Appl. No.: 12/708,426

(22) Filed: Feb. 18, 2010

(51) Int. Cl.
*G06F 3/00* (2006.01)
*G06F 11/00* (2006.01)
*G06F 3/06* (2006.01)
*G06F 11/10* (2006.01)

(52) U.S. Cl.
CPC .............. *G06F 3/0689* (2013.01); *G06F 3/067* (2013.01); *G06F 11/1076* (2013.01)
USPC ......................................................... 711/114

(58) Field of Classification Search
None
See application file for complete search history.

(56) References Cited

U.S. PATENT DOCUMENTS

| 6,748,510 | B1 * | 6/2004 | Coatney ........................ 711/170 |
| 6,839,824 | B2 * | 1/2005 | Camble et al. ................ 711/173 |
| 7,096,315 | B2 * | 8/2006 | Takeda et al. ................. 711/111 |
| 7,111,147 | B1 * | 9/2006 | Strange et al. ................ 711/209 |
| 7,146,522 | B1 * | 12/2006 | Rowe et al. ................... 714/6.12 |
| 7,490,207 | B2 * | 2/2009 | Amarendran et al. ........ 711/165 |
| 7,631,155 | B1 * | 12/2009 | Bono et al. .................... 711/156 |
| 2006/0271608 | A1 * | 11/2006 | Qi et al. ........................ 707/205 |
| 2009/0276566 | A1 * | 11/2009 | Coatney et al. ............... 711/114 |

\* cited by examiner

*Primary Examiner* — Matthew Bradley
*Assistant Examiner* — Craig Goldschmidt
(74) *Attorney, Agent, or Firm* — DeLizio Gilliam, PLLC

(57) ABSTRACT

A slice manager module, in the operating system of a storage server, manages the virtual slicing of a mass storage device. The slice manager module receives a notification that a mass storage device has been added to an array of mass storage devices coupled to the storage system. The slice manager module reads header information in the mass storage device to determine a format of the mass storage device. If the mass storage device has not been previously sliced, the slice manager module virtually slices the mass storage device into a plurality of slices, where virtually slicing the mass storage device includes specifying an offset in the mass storage device where each of the plurality of slices is located.

20 Claims, 9 Drawing Sheets

METHOD AND APPARATUS FOR SLICING MASS STORAGE DEVICES

TECHNICAL FIELD

This invention relates to the field of data storage systems and, in particular, to virtually slicing mass storage devices.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data minoring), etc.

A network storage system can include at least one storage system, which is a processing system configured to store and retrieve data on behalf of one or more storage client processing systems ("clients"). In the context of NAS, a storage system may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). In a SAN context, the storage server provides clients with block-level access to stored data, rather than file-level access. Some storage servers are capable of providing clients with both file-level access and block-level access.

As storage technology evolves, the storage capacity of mass storage devices continues to increase. For example, 2 terabyte (TB) disk drives are currently available and 4 TB and 8 TB drives will be available in the near future. As the storage capacity of the mass storage devices increases, the storage capacity of a typical aggregate (i.e., a number of RAID groups forming a storage container for file systems and/or LUNs) will grow. Additionally, the number of mass storage devices making up an aggregate will tend to decrease. With fewer mass storage devices making up an aggregate, the input/output (I/O) operations will be spread across fewer devices, negatively impacting I/O performance. Furthermore, larger mass storage devices will result in longer RAID reconstruct times.

SUMMARY OF THE INVENTION

A slice manager module, in the operating system of a storage server, manages the virtual slicing of a mass storage device. The slice manager module receives a notification that a mass storage device has been added to an array of mass storage devices coupled to the storage system. The slice manager module reads header information in the mass storage device to determine a format of the mass storage device. If the mass storage device has not been previously sliced, the slice manager module virtually slices the mass storage device into a plurality of slices, where virtually slicing the mass storage device includes specifying an offset in the mass storage device where each of the plurality of slices is located.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described to manage the virtual slicing of a mass storage device. In one embodiment, a slice manager module virtually slices a mass storage device into a plurality of slices. Each of the plurality of slices appears externally as a separate mass storage device. Virtually slicing the mass storage device includes specifying an offset in the mass storage device where each of the plurality of slices is located. Each slice of the mass storage device may be assigned to a different storage server, enabling the use of smaller units of storage, rather than an entire mass storage device.

Figure 1:
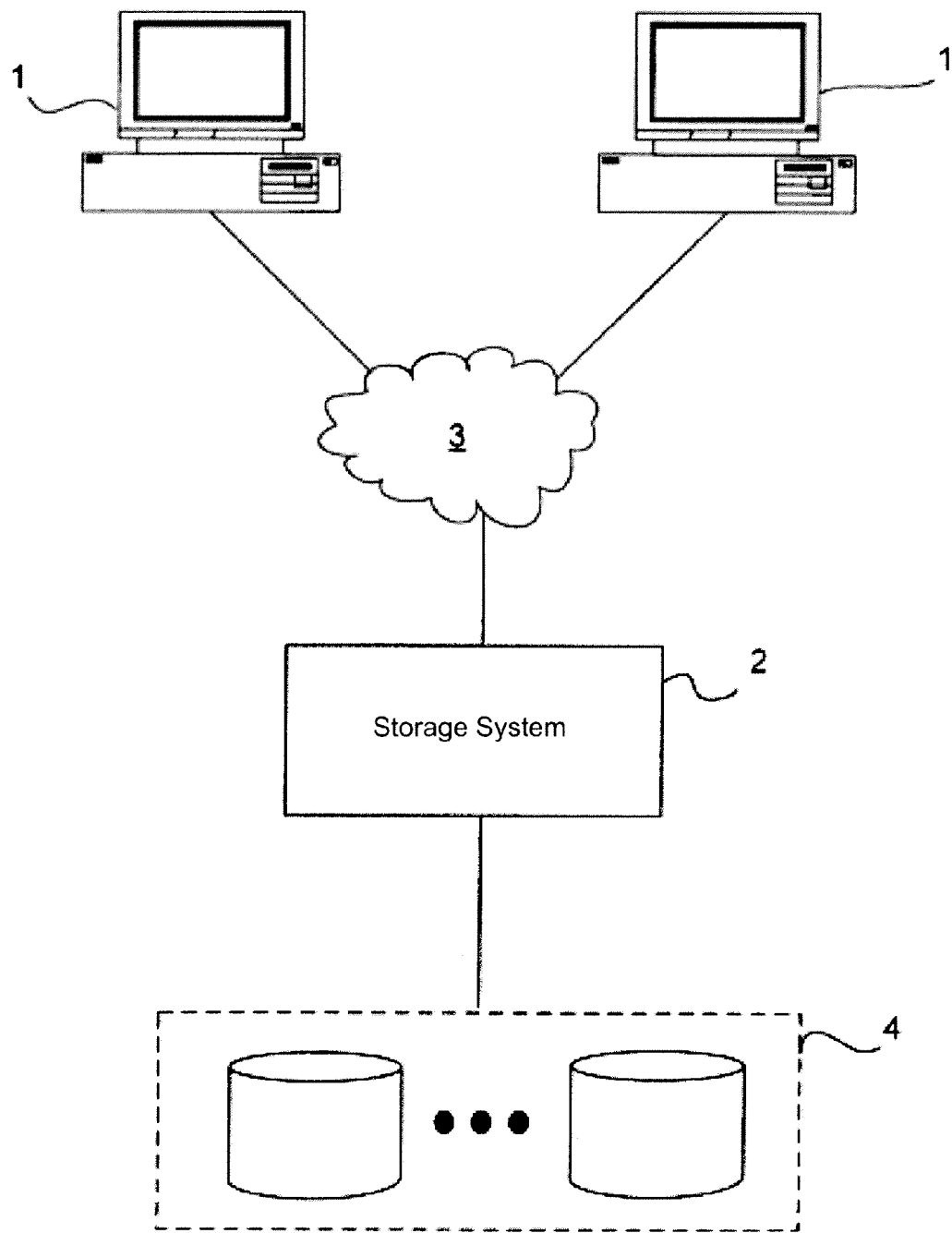
FIG. 1 is a block diagram illustrating a network environment including a storage system according to an embodiment.

FIG. 1 shows an example of a network environment which incorporates a storage system 2, which can be a file server. Note, however, that the invention is not limited to use in traditional file servers. For example, the invention can be adapted for use in other types of storage systems, such as storage servers which provide clients with block-level access to stored data or processing systems other than storage servers.

The storage system 2 in FIG. 1 is coupled locally to a storage subsystem 4 which includes a set of mass storage devices, and to a set of storage clients 1 (hereinafter simply "clients") through a network 3, which may be a local area network (LAN), a wide area network (WAN), a global area network (GAN) such as the Internet, or a combination of such networks. Each of the clients 1 may be, for example, a conventional personal computer (PC), workstation, or the like. The storage subsystem 4 is managed by the storage system 2. The storage system 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. In one embodiment, the mass storage devices in storage subsystem 4 are flash-based solid-state devices (SSDs), sometimes known as flash drives.

The storage system 2 may have a distributed architecture; for example, it may include a separate N-("network") blade and D-("disk") blade (not shown). In such an embodiment, the N-blade is used to communicate with clients 1, while the D-blade includes the file system functionality and is used to communicate with the storage subsystem 4. In one embodiment, the N-blade and D-blade communicate with each other using an internal protocol. In one embodiment, where the N-blade or D-blade has its own separate processor and memory, separate from that of the storage server, the storage device slicing method, as further described below, is implemented within the N-blade or D-blade. Alternatively, the storage system 2 may have an integrated architecture, where the network and data components are all contained in a single box. The storage system 2 further may be coupled through a switching fabric to other similar storage systems (not shown) which have their own local storage subsystems. In this way, all of the storage subsystems can form a single storage pool, to which any client of any of the storage systems has access.

Figure 2:
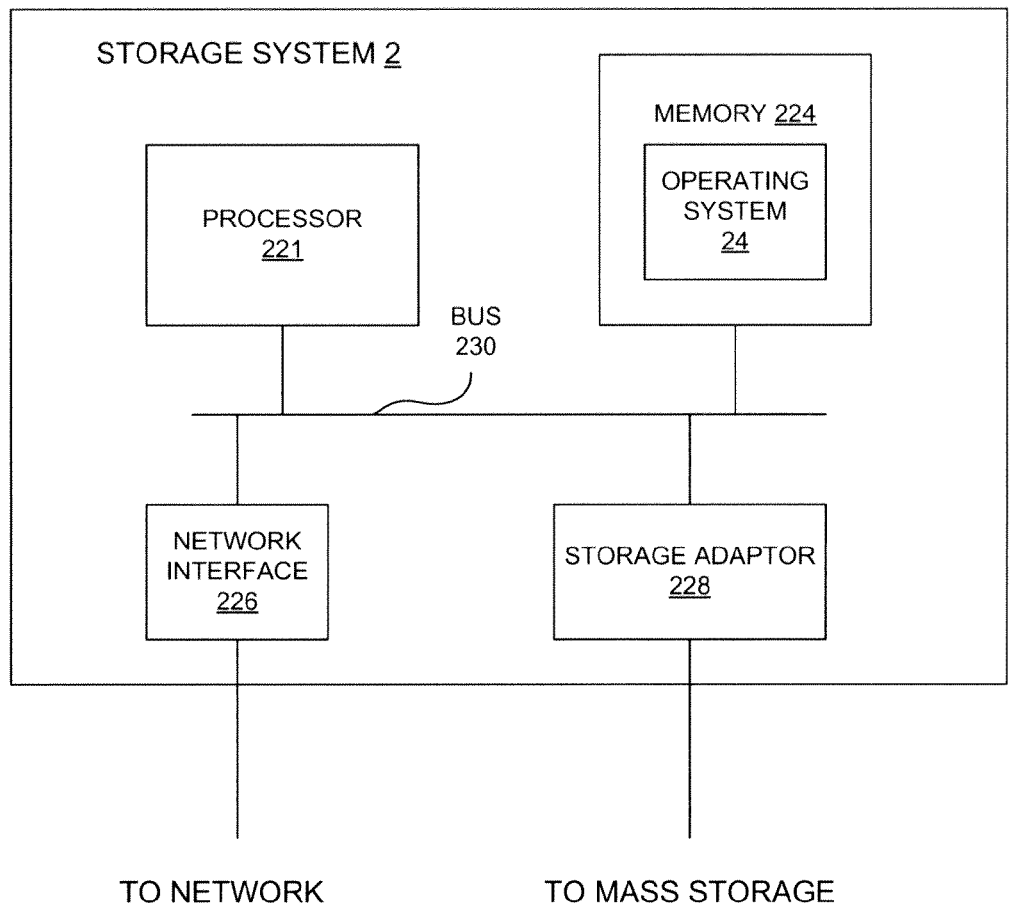
FIG. 2 is a block diagram illustrating a hardware architecture of a storage system according to an embodiment.

FIG. 2 illustrates a schematic block diagram of one embodiment of a storage system 2 which may implement the above-described schemes, according to certain embodiments of the invention. Referring to FIG. 2, in this embodiment, the storage system 2 includes a processor 221, a memory 224, a network interface 226, and a storage adaptor 228, which are coupled to each other via a bus system 230. The bus system 230 may include one or more busses and/or interconnects. The storage system 2 communicates with a network via the network interface 226, which may be an Ethernet adaptor, fiber channel adaptor, etc. The network interface 226 may be coupled to a public network, a private network, or a combination of both in order to communicate with a client machine usable by an administrator of the remote data storage system.

In one embodiment, the processor 221 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 24. The processor 221 retrieves the instructions from the memory 224 to run the operating system 24. The storage system 2 interfaces with one or more storage systems via the storage adaptor 228, which may include a small computer system interface (SCSI) adaptor, fiber channel adaptor, etc.

Figure 3:
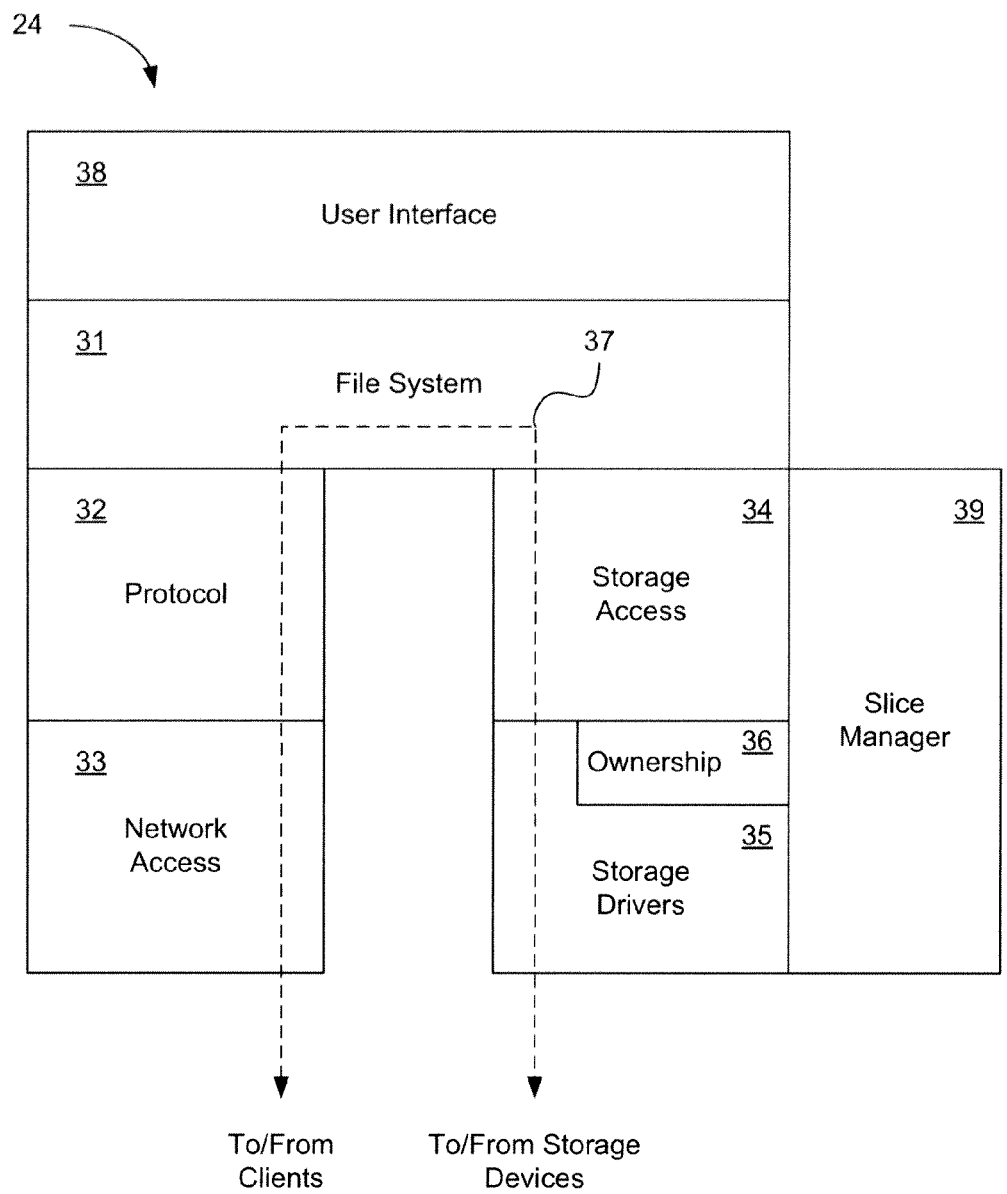
FIG. 3 is a block diagram illustrating the architecture of the operating system of the storage system according to an embodiment.

FIG. 3 shows an example of the operating system 24 of the storage system 2. As shown, the operating system 24 includes several modules, or "layers." These layers include a file system 31. The file system 31 is software, executed by a processor, that imposes a hierarchy (e.g., a directory/file structure) on the data stored in the storage subsystem 4 and manages read/write operations on the data (i.e., executes read/write operations on the disks in response to client requests). The operating system 24 also includes a protocol layer 32 and an associated network access layer 33, to allow the storage system 2 to communicate over the network 3 (e.g., with clients 1). The protocol 32 layer implements a number of higher-level network protocols, such as Network File System (NFS), Common Internet File System (CIFS), Hypertext Transfer Protocol (HTTP) and/or Transmission Control Protocol/Internet Protocol (TCP/IP). The network access layer 33 includes one or more drivers which implement one or more lower-level protocols to communicate over the network, such as Ethernet or Fibre Channel.

The operating system 24 also includes a storage access layer 34 and an associated storage driver layer 35, to allow the storage system 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, RAID-5 or RAID-DP, and therefore it is alternatively called the "RAID layer" 34. A software disk ownership layer 36 maintains ownership information for which disks or slices in storage subsystem 4 are owned by storage server 2.

Also shown in FIG. 3 is the path 37 of data flow, through the operating system 24, associated with a read or write operation. The operating system 24 also includes a user interface 38 to generate a command line interface (CLI) and/or graphical user interface (GUI), to allow administrative control and configuration of the storage system 2, from a local or remote terminal.

In certain embodiments, as illustrated in FIG. 3, the operating system 24 further includes a slice manager module 39, to manage the slicing of the mass storage devices in storage subsystem 4. Slice manager module 39 controls the virtual slicing of large mass storage devices into smaller more manageable slices. When virtually sliced, a mass storage device is logically divided into a number of logical partitions, where each slice appears externally as a separate mass storage device. In one embodiment, a slice may have a storage capacity approximately in a range of 20 gigabytes (GB) to 500 GB. In other embodiments, a slice may have some other storage capacity.

Figure 4:
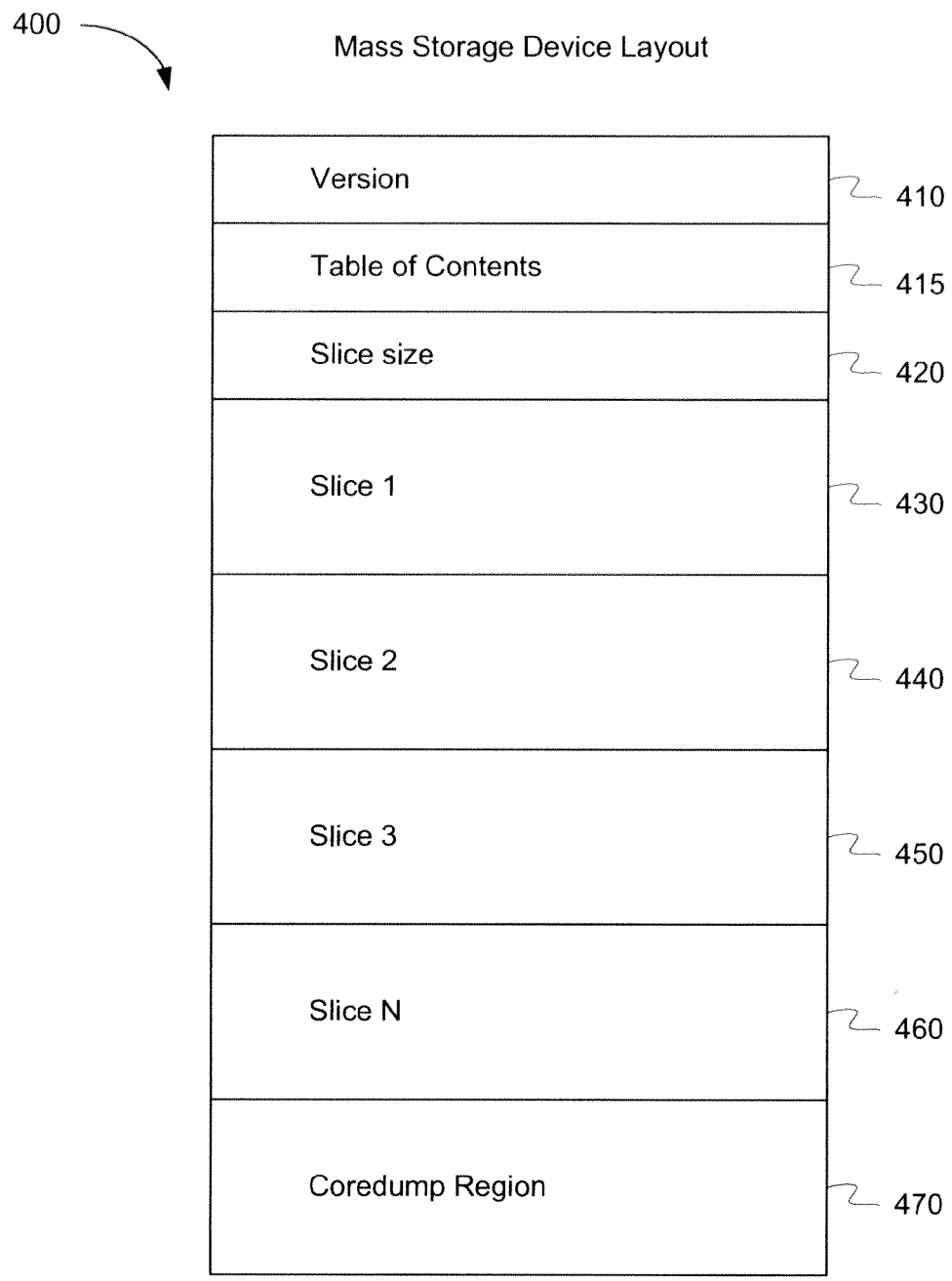
FIG. 4 is a block diagram illustrating the layout of a mass storage device according to an embodiment.

FIG. 4 is a block diagram illustrating the layout of a mass storage device according to an embodiment. The mass storage device 400, may be for example, one of the mass storage devices in the storage subsystem 4 of FIG. 1. In one embodiment, the mass storage device 400 includes a header region 410-420, slices 430-460, and a coredump region 470. The header region includes version field 410, table of contents 415 and slice size field 420. Version field 410 stores a version number corresponding to the current layout of the storage device 400. The version number may be used by an operating system, such as operating system 24, to reference the current layout of the mass storage device 400. Table of contents 415 may be present on a mass storage device 400 that supports different slice sizes on the same device. In one embodiment, the table of contents stores label information, including the sizes and slice offsets, and software disk ownership information of each slice on the device. This may improve assimilation performance and reduce seeks. If the slice sizes are the same on a given mass storage device, slice size field 420 stores a value indicating the storage capacity of each of the slices 430-460. In other embodiments, mass storage device 400 may include other regions.

In one embodiment, the sizes of slices 430-460 are allocated to fill the entire storage capacity of the mass storage device 400. For example, if the available capacity of mass storage device 400, after reserving an area for the header region and the coredump region, is 1.9 terabytes (TB), and it is desired to virtually slice the storage device into four slices, each slice is allocated a capacity of 475 gigabytes (GB). In another embodiment, a common slice size is chosen for all storage devices 400 attached to the storage system 2, regardless of the capacity of each device. In such an embodiment, there may be N slices, all having an equal capacity in storage device 400. For example, if the available storage capacity is 1.9 TB, but a global slice size of 500 GB is desired, the storage device 400 is virtually sliced into three slices having a capacity of 500 GB with 400 GB leftover. Another storage device 400 of a different capacity attached to the same storage system 2 may have a different number of slices of 500 GB each. In alternative embodiments, some other algorithm may be used to determine the sizes of slices 430-460.

Coredump region 470 stores a full range of data to facilitate troubleshooting a current or pending problem. For example, coredump region 470 may include all diagnostic logs available for the storage device 400. When the operating system detects an internal fatal error it may initiate an action known as a system panic. In the event of a system panic, the data stored in coredump region 470 is transmitted to a support center designated by the operating system for use in debugging the problem. The method for reporting such a device failure is described further below with respect to FIG. 9.

Figure 5:
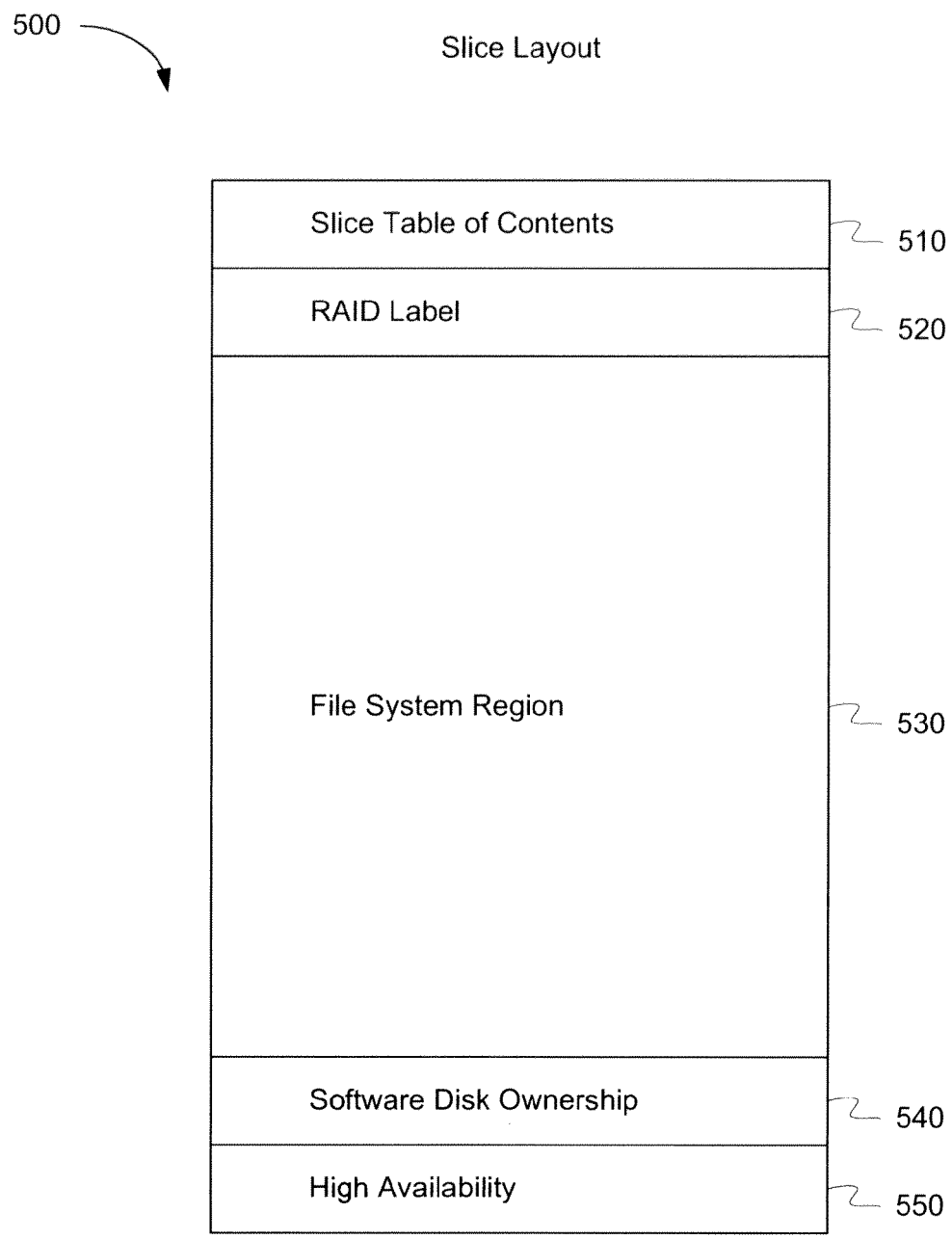
FIG. 5 is a block diagram illustrating the layout of a slice of a mass storage device according to an embodiment.

FIG. 5 is a block diagram illustrating the layout of a slice of a mass storage device according to an embodiment. Slice 500 represents a virtual slice of a mass storage device, such as one of slices 430-460. Slice 500 has a layout, such that when accessed by layers of the operating system 24 or by other storage servers in the system, the slice appears and functions as an independent mass storage device. In one embodiment, slice 500 includes table of contents 510, RAID label 520, file system region 530, software disk ownership region 540 and high availability (HA) region 550. In other embodiments, slice 500 may include other regions.

Slice Table of Contents 510 contains information specifying where the regions 510-550 reside within the slice. In one embodiment, the information is in the form of logical block address offsets from the logical block address of the Slice Table of Contents 510 itself. Logical block addressing (LBA) is a common scheme used for specifying the location of blocks of data stored on computer storage devices. In one embodiment, the logical block address offsets refers to a specific address on the disk in relation to the start of the disk.

RAID label 520 contains information used by the Storage Access layer 34 to place chunks of data from the slice into RAID groups and aggregates for use by the File System 31. For example, this information may include identifiers for other slices 500 that belong to the same RAID group as the containing slice 500, and information describing where those slices logically fit within the address range of the aggregate composed of that RAID group. For example, a RAID group may be formed from slice 500, along with a number of other slices. RAID label 520 stores information about the relation of the address of slice 500 to that of the other slices in the RAID group.

File system region 530 is a portion of the slice 500 where file system metadata and user data is stored. A user of the system, such as client device 1, may access file system region 530, through storage system 2, to read or write data to the slice 500. Software disk ownership region 540 contains a value specifying which node currently owns slice 500, and a value specifying which node should own, the slice 500. In one embodiment, in a system with a plurality of nodes (i.e., storage servers) that share an array of mass storage devices, each slice is owned by one node at a given time. The value in software disk ownership region 540 specifies that node and other disk configuration data. In one embodiment, the ownership information in region 540 refers to the node that is currently services access requests for the data stored on slice 500.

In one embodiment, high availability region 550 contains heartbeat information and information on the node which a partner node can read. This information may include a filer serial number, a software version number, and a node name. In addition, there may be information in high availability region 550 which can indicate if the node has been taken over.

Figure 6:
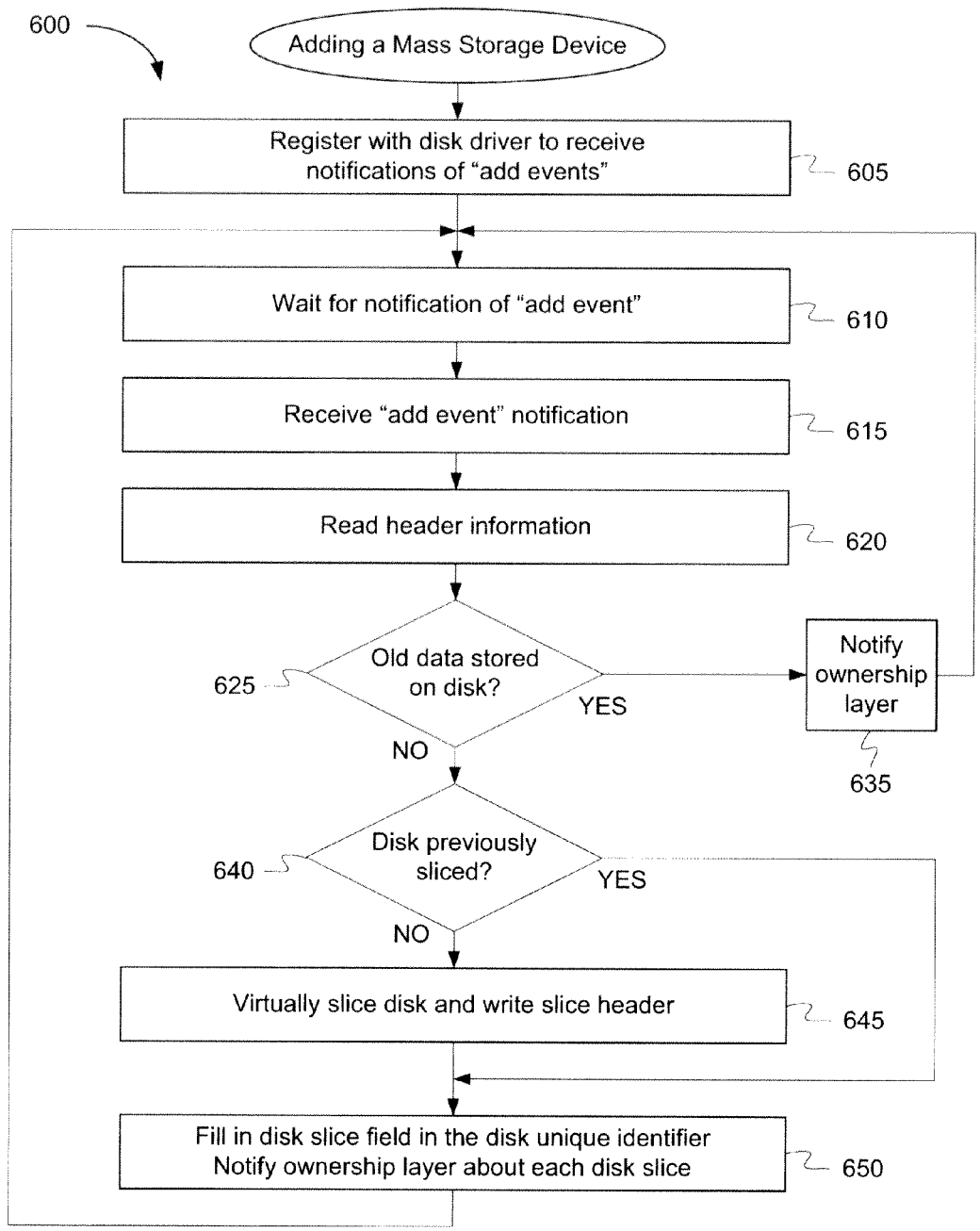
FIG. 6 is a flow chart illustrating a method for adding a mass storage device to the system according to an embodiment.

FIG. 6 is a flow chart illustrating a method for adding a mass storage device to the system according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 600 is performed by storage system 2 of FIG. 1. For example, the slice manager module 39 stored in the operating system 24 of storage system 2, may control the addition of a new mass storage device to storage subsystem 4.

Referring now to FIG. 6, at block 605, slice manager module 39 of FIG. 3 registers with the storage driver 35 in order to receive notifications of "add events." Upon registration, slice manager module 39 instructs the storage driver 35 to send a notification any time an "add event" occurs. In one embodiment, an "add event" occurs any time a new storage device, such as mass storage device 400 of FIG. 4, is added to the network storage system. Once registered with storage driver 35, at block 610, slice manager module 39 waits to receive a notification that an "add event" has occurred. Upon occurrence of an "add event," the storage driver 35 will send a notification to slice manager module 39, which is received at block 615.

At block 620, slice manager module 39 reads the header information of the newly added mass storage device. The location of the header information in the storage device may be determined when the disk is initialized. The header information may include version number 410 and slice size 420, as shown in FIG. 4. Slice manager module 39 can access slicing information stored in a data structure in operating system 24 for the newly added mass storage device based on the version number 410. The slicing information may include, whether or not disk has been sliced, how many slices there are, the capacity of each slice, the offset of each slice within the mass storage device, and other information.

At block 625, slice manager module 39 determines if the disk is an old disk, already containing data. This is determined from the header information discussed above. If the disk has old data stored thereon, method 600 proceeds to block 635. At block 635, slice manager module 39 notifies the software disk ownership layer 36, which reads ownership information from the storage device, indicating which node owns the disk.

If at block 625, method 600 determines that the newly added mass storage device was not in the old format, method 600 proceeds to block 640. At block 640, method 600 determines whether the disk was previously sliced by reading the disk header information or by referencing the version number of the disk in the data structure stored in operating system 24. If the disk was not previously sliced, method 600 proceeds to block 645. At block 645, method 600 virtually slices the mass storage device and writes the slice header to the mass storage device containing information about the slices. Further details of virtually slicing a mass storage device are provided below with respect to FIG. 7. When the mass storage device is sliced, or if at block 640 method 600 determines that the storage device was previously sliced, at block 650, the disk slice field is filled in the disk unique identifier. Additionally, slice manager module 39 notifies the software disk ownership layer 36, which updates the slice ownership information. Slice ownership information is written to each slice in the storage device saying which node owns the slice. The ownership information may be stored in each slice in software disk ownership region 540. Method 600 returns to block 610 and continues.

Figure 7:
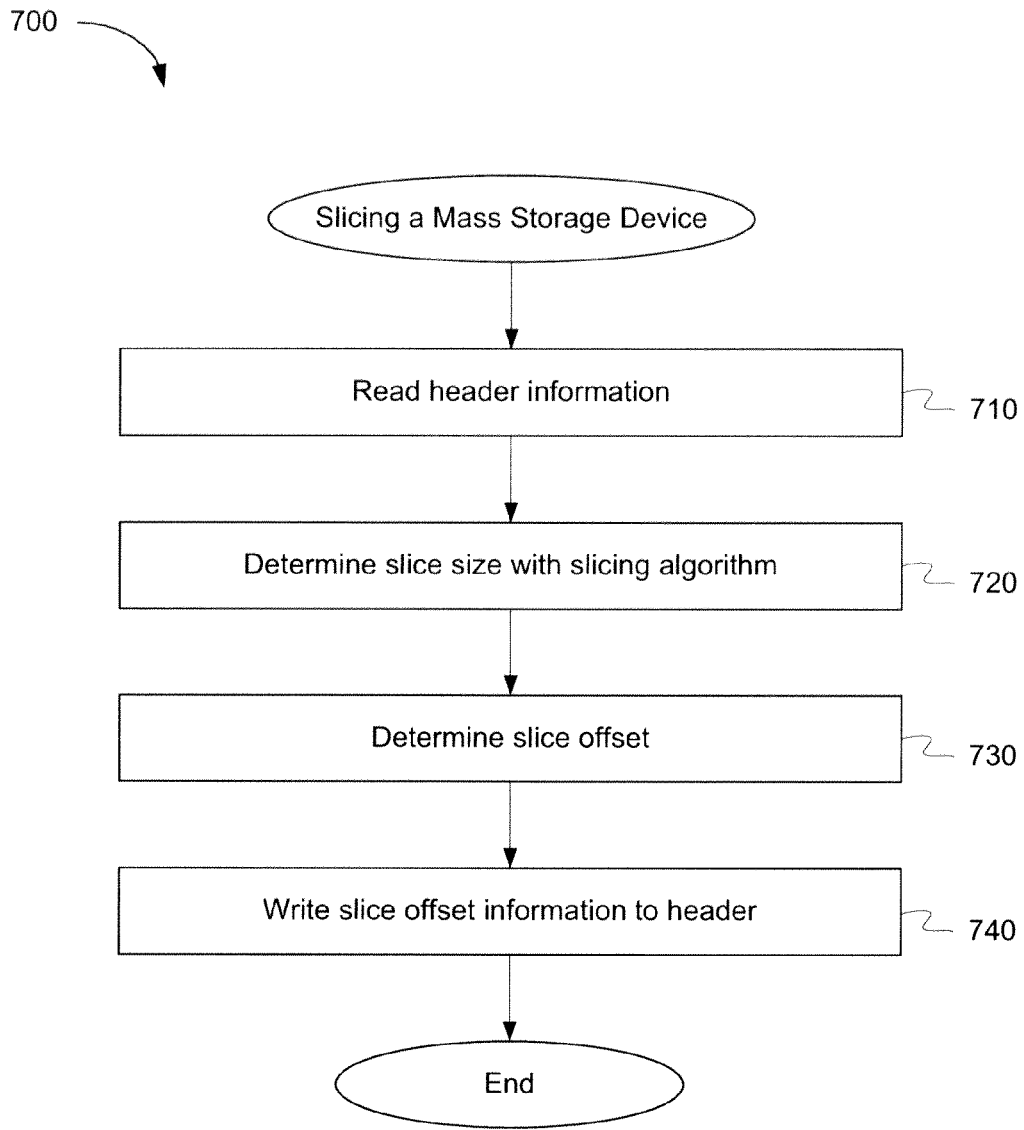
FIG. 7 is a flow chart illustrating a method for virtually slicing a mass storage device into a plurality of slices according to an embodiment.

FIG. 7 is a flow chart illustrating a method for virtually slicing a mass storage device into a plurality of slices according to an embodiment. The method 700 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 700 is performed by storage system 2 of FIG. 1. At block 710, slice manager module 39 of FIG. 3 reads the header information of the mass storage device to be virtually sliced. The header information may include the current layout of the mass storage device, the capacity of the mass storage device, and other information.

At block 720, method 700 determines a slice size based on a slicing algorithm. As discussed above with respect to FIG. 4, there are a number of slicing algorithms that may be used. For example, the mass storage device may be divided into a set number of slices each having equal capacity, or the mass storage devices may be divided up into a number slices each having a predetermined size. In one embodiment, each slice has the same capacity, however in other embodiments, a first slice may have a different storage capacity than a second slice. In another embodiment, each slice may have a different storage capacity. In one embodiment, the desired slice size and slicing algorithm are predetermined by a system administrator. In another embodiment, the system is programmable, so that a user (i.e., through client device 1) may specify the desired size and/or algorithm. In another embodiment, the slice size is hard-coded into the product, for each of several storage device types. For example, 100 GB for all SATA HDDs (serial advanced technology attachment hard disk drives), 25 GB for all SAS (serial attached SCSI) and FC (Fibre Channel) HDDs, and 10 GB for all SSDs (solid state drives). In one embodiment, the slice size may be read from the header information of the storage device upon initialization the disk.

Once the slicing algorithm and slice size have been determined, at block 730, method 700 determines a slice offset for each slice. The slice offset may be a logical block address (LBA) range in the mass storage device to which a particular slice is allocated. In one embodiment, the offset of each slice may be sequential, where the start of one slice immediately follows the end of a preceding slice. At block 740, method 700 writes the slice offset information to the header region of the mass storage device. For example, the slice offset information may be written into the Table of Contents 415.

Figure 8:
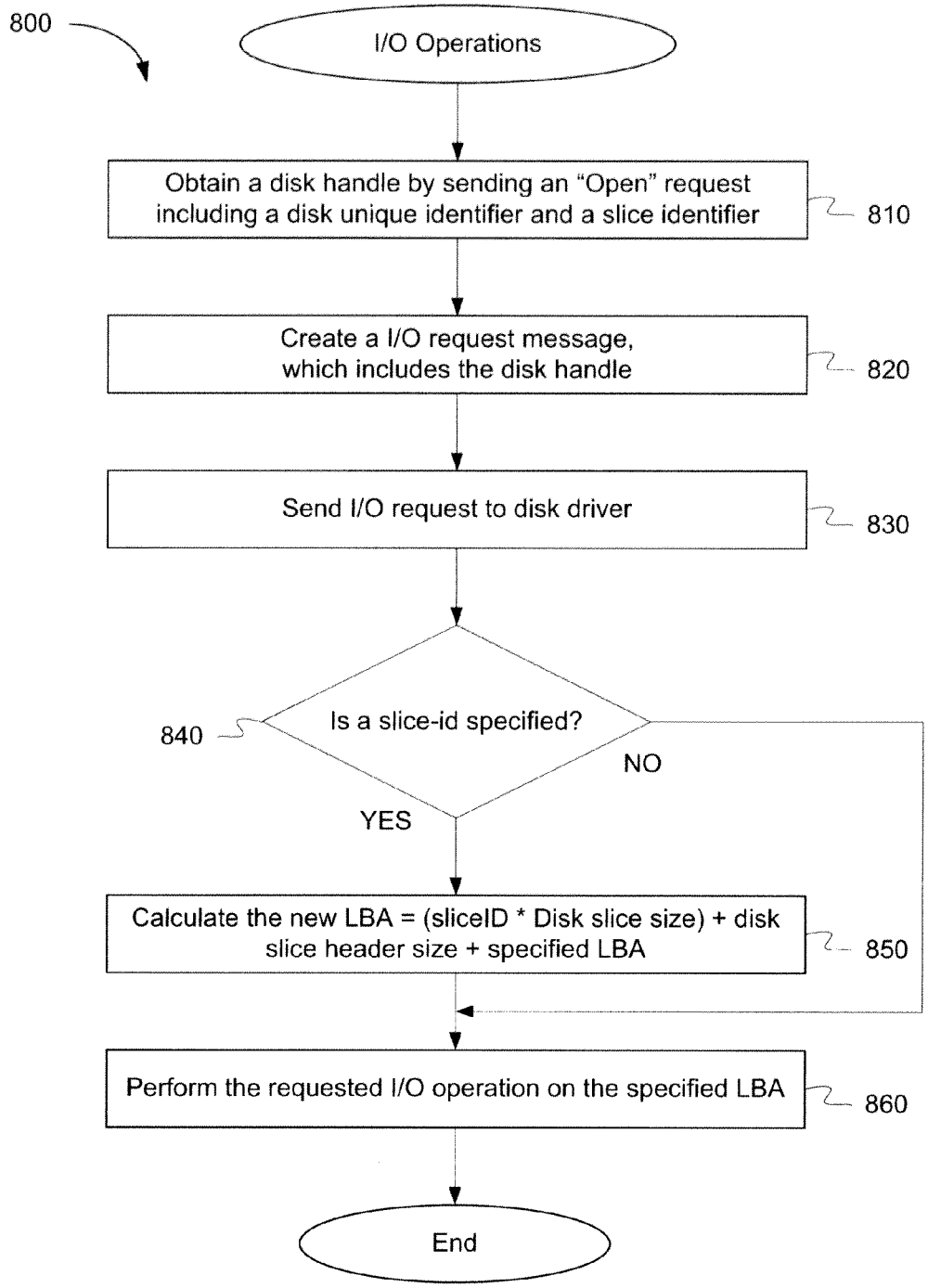
FIG. 8 is a flow chart illustrating a method for handling input and output (I/O) operations in the system according to an embodiment.

FIG. 8 is a flow chart illustrating a method for handling input and output (I/O) operations in the system according to an embodiment. The method 800 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 800 is performed by storage system 2 of FIG. 1. For example, a client device 1 may make a read or write request for data stored on a mass storage device in storage subsystem 4. The request is processed by storage system 2.

Referring to FIG. 8, at block 810, method 800 obtains a disk handle by sending an "Open" request from a layer of the operating system 24 making an I/O request. The layer may be, for example, the file system layer 31 or the RAID layer 34, shown in FIG. 3. The "Open" request specifies the disk and/or slice to which the I/O operation is directed using a disk unique identifier and a slice identifier. Each layer of the operating system 24 may use a unique identifier to refer to a particular mass storage device. Another identifier is needed to specify the newly created slices on the mass storage device. In one embodiment, the slice identifier is concatenated on to the end of the previously used disk unique identifier. Nevertheless, the identifier remains unique to each layer of the operating system 24. The handle is used to identify the targeted disk slice without the need to reference each layer's disk unique identifier and slice identifier.

At block 820, method 800 creates an I/O request message, which includes the disk handle obtained at block 810. At block 830, method 800 sends the I/O request message to the disk driver (e.g., storage driver 35). At block 840, method 800 determines whether a particular slice identifier is specified in the request. If a particular slice identifier is specified in the I/O request, method 800 proceeds to block 850. At block 850, method 800 calculates a new logical block address (LBA). In one embodiment, the LBA is the offset into the storage device where the data is actually written to or read from. The location specified by the LBA may be determined by taking the disk slice header size plus the specified slice identifier times the disk slice size, which identifies the correct slice, plus a specified LBA to reach the correct location within the disk slice. If a particular slice identifier is not specified in the request, method 800 proceeds to block 860. At block 860, method 800 performs the requested I/O operation on the LBA specified in the request.

Figure 9:
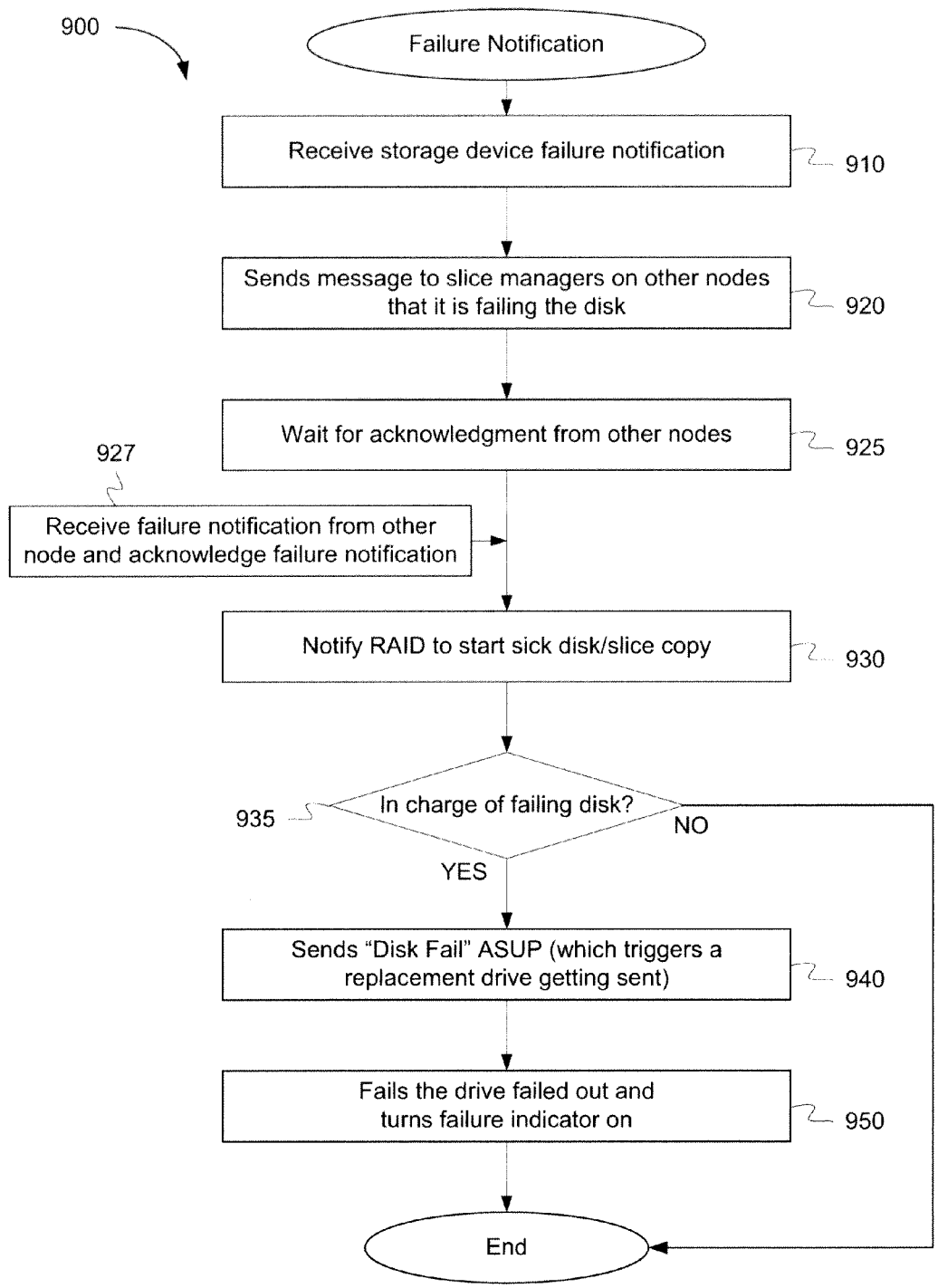
FIG. 9 is a flow chart illustrating a method for reporting the failure of a mass storage device in the system according to an embodiment.

FIG. 9 is a flow chart illustrating a method for reporting the failure of a mass storage device in the system according to an embodiment. The method 900 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 900 is performed by storage system 2 of FIG. 1. At block 910, slice manager module 39 of FIG. 3 receives a storage device failure notification. The mass storage device, such as a storage device in storage subsystem 4 of FIG. 1, may be susceptible to a number of hardware errors. The occurrence of such an error is detected by storage driver 35, which notifies the slice manager module 39.

In a system, where a disk that has been sliced, for example into 10 slices, fails, each storage system which owns one of the 10 slices would detect the disk failure. Rather than have each node report the failure of the disk, the slice manager module 39 coordinates handling of the error message reporting among all the storage systems. In one embodiment, the first slice manager module 39 to detect an error will handle error message reporting. If multiple slice manager modules detect an error simultaneously, one slice manager module will be designated to coordinate the error message reporting. At block 920, if slice manager module 39 is the slice manager module which is handling the error message reporting, slice manager module 39 sends a message to the slice managers on all other storage systems which currently own a slice of the failed disk, indicating that slice manager module 39 will fail the disk. At block 925, slice manager module 39 waits for an acknowledgement from other nodes indicating that they received the error message sent at block 920. If slice manager module 39 is not the slice manager handling the error reporting, the slice manager module receives the failure notification from another node and acknowledges receipt of the failure notification at block 927. At block 930, slice manager module 39 notifies the RAID layer 34 to begin a copy of the slice from the failed disk owned by the node. If the disk is not sliced, the entire disk may be copied.

At block 935, method 900 determines whether slice manager 39 is in charge of failing the disk. If slice manager module 39 is in charge of failing the disk, at block 940, slice manager module 39 sends a disk failure notification message to a system support center (e.g., the storage system vendor). The disk failure notification message may be sent via email or Hypertext Transport Protocol (HTTP) or Hypertext Transport Protocol (Secure) (HTTPS). The disk failure notification message may include data associated with the health of the storage system, data associated with any problems detected by the storage system, and/or additional data. Commonly, disk failure notification messages include a full range of data to facilitate troubleshooting a current or pending problem. For example, the disk failure notification messages may include the information stored in coredump region 470 of the failed mass storage device. At block 950, slice manager module 39 fails the failed storage device. Slice manager module 39 may also turn a failure indicator on to make the failed storage device easier to find. In one embodiment, the failure indicator may be a light, such as a light emitting diode (LED). If at block 935 it is determined that slice manger module 39 is not in charge of failing the disk, method 900 ends.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
receiving, by a storage system, a notification that a mass storage device has been added to an array of mass storage devices coupled to the storage system, wherein the storage system is one of a plurality of storage systems;
reading header information in the mass storage device to determine a format of the mass storage device; and
if the mass storage device has a first format, virtually slicing the mass storage device into a plurality of slices, wherein each of the plurality of slices comprises a table of contents, a RAID label, and an ownership region, wherein the table of contents contains an address offset identifying a slice location, wherein the RAID label contains identifiers for other slices that belong to a same RAID group as the containing slice, and information describing where the slices fit in an address range of an aggregate of the same RAID group, wherein the ownership region specifies a node that owns the slice, and wherein at least two of the plurality of slices on the mass storage device are assigned to different storage systems.

2. The method of claim 1, wherein virtually slicing the mass storage device further comprises:
determining a slicing algorithm;
determining a size of the plurality of slices based on the slicing algorithm; and writing the respective slice address offset for each of the plurality of slices to the header information in the mass storage device.

3. The method of claim 2, wherein each of the plurality of slices has a same size.

4. The method of claim 2, wherein a first slice of the plurality of slices has different size than a second slice of the plurality of slices.

5. The method of claim 1, further comprising:
if the mass storage device has a second format, sending slice information from the header information of the mass storage device to the ownership region.

6. The method of claim 1, further comprising:
detecting a failure of a mass storage device;
notifying other storage systems of the mass storage device failure; and
sending a mass storage device failure notification to a support center.

7. A system comprising:
an array of mass storage devices;
a storage server, coupled to the array of mass storage devices, the storage server configured to:
receive a notification that a mass storage device has been added to the array of mass storage devices;
read header information in the mass storage device to determine a format of the mass storage device; and
if the mass storage device has a first format, virtually slice the mass storage device into a plurality of slices, wherein each of the plurality of slices has an offset identifying a slice location, wherein each of the plurality of slices comprises a table of contents, a RAID label, and an ownership region, wherein the table of contents contains an address offset identifying a slice location, wherein the RAID label contains identifiers for other slices that belong to a same RAID group as the containing slice, and information describing where the slices fit in an address range of an aggregate of the same RAID group, wherein the ownership region specifies a node that owns the slice, and wherein at least two of the plurality of slices on the mass storage device are assigned to different storage systems.

8. The system of claim 7, wherein when configured to virtually slice the mass storage device, the storage server is further configured to:
determine a slicing algorithm;
determine a site of the plurality of slices based on the slicing algorithm; and
write the respective slice address offset for each of the plurality of slices to the header information in the mass storage device.

9. The system of claim 8, wherein each of the plurality of slices has a same size.

10. The system of claim 8, wherein a first slice of the plurality of slices has different size than a second slice of the plurality of slices.

11. The system of claim 7, wherein the storage server is further configured to:
if the mass storage device has a second format, sending slice information from the header information of the mass storage device to the ownership region.

12. The system of claim 7, wherein the storage server is further configured to:
detect a failure of a mass storage device;
notify other storage systems of the mass storage device failure; and
send a mass storage device failure notification to a support center.

13. A storage system comprising:
a processor unit; and
a memory coupled to the processor unit, the memory storing instructions executable by the processor unit, for a slice manager module, the slice manager module configured to:
receive a notification that a mass storage device has been added to an array of mass storage devices coupled to the storage system;
read header information in the mass storage device to determine a format of the mass storage device; and
if the mass storage device has a first format, virtually slice the mass storage device into a plurality of slices, wherein each of the plurality of slices has an offset identifying a slice location, wherein each of the plurality of slices comprises a table of contents, a RAID label, and an ownership region, wherein the table of contents contains an address offset identifying a slice location, wherein the RAID label contains identifiers for other slices that belong to a same RAID as the containing slice, and information describing where the slices fit in an address range of an aggregate of the same RAID group, wherein the ownership region specifies a node that owns the slice, and wherein at least two of the plurality of slices on the mass storage device are assigned to different storage systems.

14. The storage system of claim 13, wherein when configured to virtually slice the mass storage device, the slice manager module is further configured to:
determine a slicing algorithm;
determine a size of the plurality of slices based on the slicing algorithm; and
write the respective slice address offset for each of the plurality of slices to the header information in the mass storage device.

15. The storage system of claim 14, wherein each of the plurality of slices has a same size.

16. The storage system of claim 14, wherein a first slice of the plurality of slices has different size than a second slice of the plurality of slices.

17. The storage system of claim 13, wherein the slice manager module is further configured to:
if the mass storage device has a second format, sending slice information from the header information of the mass storage device to the ownership region.

18. The storage system of claim 13, wherein the slice manager module is further configured to:
detect a failure of a mass storage device;
notify other storage systems of the mass storage ice failure; and
send a mass storage device failure notification to a support center.

19. A method comprising:
determining, by a storage system, that a mass storage device has been added to an array of mass storage devices coupled to the storage system;
receiving input specifying a slicing algorithm for virtually slicing the mass storage device;
determining a size for each of a plurality of slices of the mass storage device based on the slicing algorithm; and
virtually slicing the mass storage device into the plurality of slices, wherein each of the plurality of slices comprises a table of contents, a RAID label, and an ownership region, wherein the table of contents contains an address offset identifying a slice location, wherein the RAID label contains identifiers for other slices that belong to a same RAID group as the containing slice, and information describing where the slices fit in an address range of an aggregate of the same RAID group, wherein the ownership region specifies a node that owns the slice, and wherein at least two of the plurality of slices on the mass storage device are assigned to different storage systems.

20. The method of claim 1, wherein the value is stored in a header region of the mass storage device.

* * * * *